W. H. MARTIN.
ADJUSTABLE STAND.
APPLICATION FILED MAY 16, 1910.
994,598.
Patented June 6, 1911.
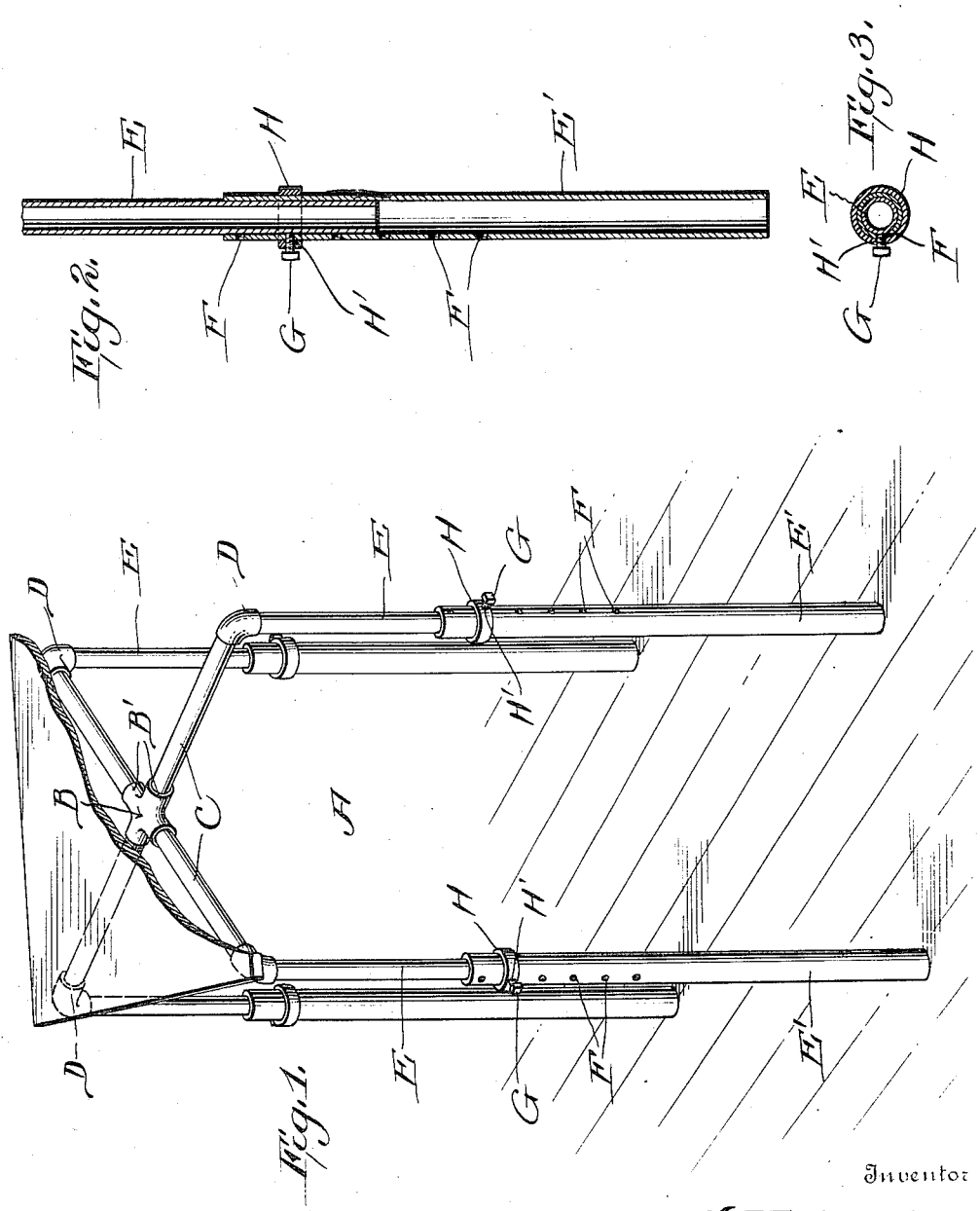
Witnesses
Inventor
W. H. Martin

UNITED STATES PATENT OFFICE.

WILLIAM H. MARTIN, OF DES MOINES, IOWA.

ADJUSTABLE STAND.

994,598.

Specification of Letters Patent.   Patented June 6, 1911.

Application filed May 16, 1910. Serial No. 561,637.

*To all whom it may concern:*

Be it known that I, WILLIAM H. MARTIN, a citizen of the United States, residing at Des Moines, in the county of Polk and State of Iowa, have invented a new and useful Improvement in Adjustable Stands, of which the following is a specification.

This invention relates to certain new and useful improvements in stands used by carpenters, plasterers and paper-hangers, the object being to provide a stand on which a platform can be placed, in such a manner that the same will be supported so that all danger of the same tilting is prevented.

Another object of my invention is to provide a stand with adjustable legs, whereby the same can be adjusted to any height desired, and locked in its adjusted position securely, so that all danger of the same collapsing is prevented.

A still further object of my invention is to provide a stand which is exceedingly cheap and simple in construction, and one which is very strong and durable, the parts being so connected that when in a set up position, a very rigid stand will be formed.

With these and other objects in view, the invention consists in the novel features of construction, combination and arrangement of parts, hereinafter fully described and pointed out in the claims.

In the drawing forming a part of this specification: Figure 1 is a perspective view of my improved stand, partly broken away. Fig. 2 is a longitudinal section through one of the telescoping legs. Fig. 3 is a horizontal section.

In carrying out my improved invention I employ a stand A which is preferably formed of pipe comprising a central coupling member B having oppositely disposed branches B', to which are connected horizontal pipe sections C, said pipe sections being threaded into the coupling member B, and having threaded outer ends, on which are mounted elbow couplings D, in which are threaded the upper ends of telescoping legs E. The legs E are formed of two sections, one fitting within the other, the outer section E' having a series of threaded bores F adapted to receive a set screw G carried by a threaded bore H' formed in a collar H, arranged over the outer section for clamping the sections of the legs in their adjusted positions in respect to each other, whereby the horizontal members of the stand can be adjusted to any height desired, or any one of the same adjusted independently, so as to allow the stand to be used on an uneven surface.

In using my improved stand, a platform I is placed on the same on which the mechanic stands, and it will be seen that the platform will be so supported that it will be impossible for the same to tilt in any way. It will also be seen that the stand can be readily taken apart for shipping and packed so that the same will occupy a very small space.

Having thus fully described my invention, what I claim as new and desire to secure by Letters Patent is:—

1. A stand of the kind described comprising a central coupling member having oppositely disposed branches at right angles to each other, horizontal pipes secured in said branches provided with threaded outer ends, elbows secured on said threaded ends, leg sections secured in said elbows, lower leg sections arranged over the first mentioned sections having a series of threaded bores, and a collar surrounding said lower section carrying a set screw adapted to extend through said threaded bores and engaging the upper sections of said legs for locking the same in their adjusted positions.

2. As a new article of manufacture, a support or stand comprising a coupling member having oppositely disposed branches extending therefrom, pipe sections carried by said branches, elbow couplings carried by the ends of said pipe sections, legs carried by the elbow couplings, said legs comprising a pair of telescoping sections, the outer sections being provided with threaded bores, and collars carried by the outer sections carrying clamp screws extending through the bores of the outer sections, and engaging the inner sections for locking the sections in their adjusted positions in respect to each other.

WILLIAM H. MARTIN.

Witnesses:
EDITH W. JOHNSON,
PAUL M. PAYNE.